United States Patent
Lindgren

[11] 3,882,605
[45] May 13, 1975

[54] MACHINING GAUGE

[76] Inventor: George V. Lindgren, 139 Highland St., Townsend, Mass. 01469

[22] Filed: Sept. 27, 1973

[21] Appl. No.: 401,431

Related U.S. Application Data

[63] Continuation of Ser. No. 183,165, Sept. 23, 1971, abandoned.

[52] U.S. Cl. .................................. 33/170; 151/16
[51] Int. Cl. ............................................. G01b 5/00
[58] Field of Search ...... 33/164 C, 166, 170, 168 R; 151/16

[56] References Cited
UNITED STATES PATENTS

| | | |
|---|---|---|
| 1,358,795 | 11/1920 | Stillwell ........................... 151/16 X |
| 2,247,797 | 7/1941 | Anderson .......................... 33/170 X |
| 2,344,878 | 3/1944 | Jarosz ............................. 33/164 C |
| 2,819,529 | 1/1958 | Beck ............................... 33/164 C |
| 3,611,577 | 10/1971 | Smith ................................. 33/166 |

Primary Examiner—William D. Martin, Jr.
Attorney, Agent, or Firm—Norman S. Blodgett; Gerry A. Blodgett

[57] ABSTRACT

A machining gauge having two adjustable parts, having a lock for locking them in a position of adjustment, and having a replaceable part with a round, substantially uninterrupted, flat surface adapted to carry a marking compound.

6 Claims, 3 Drawing Figures

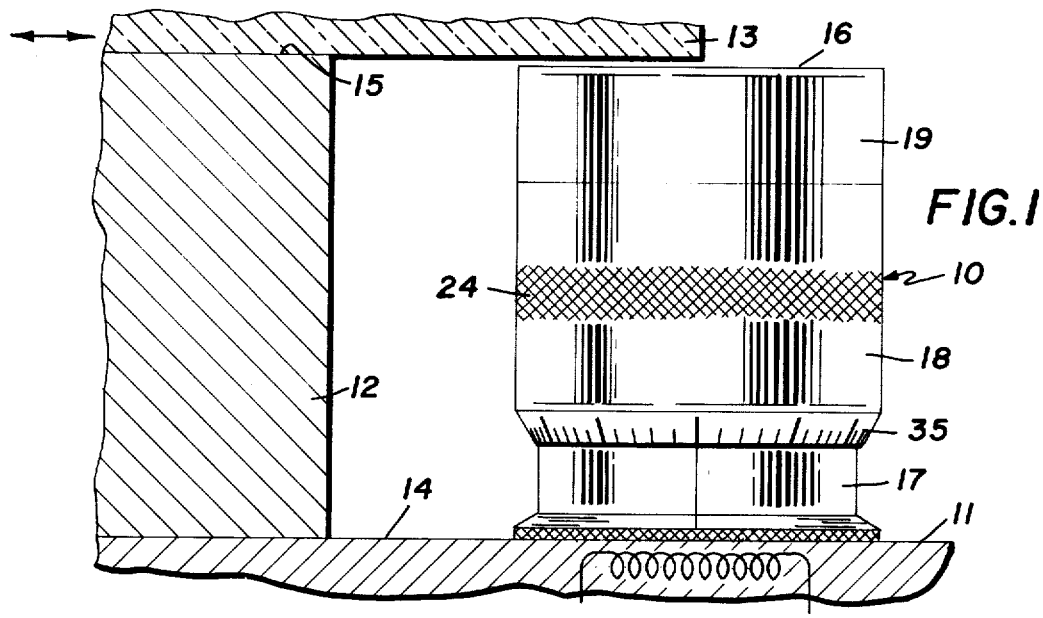
FIG. 1
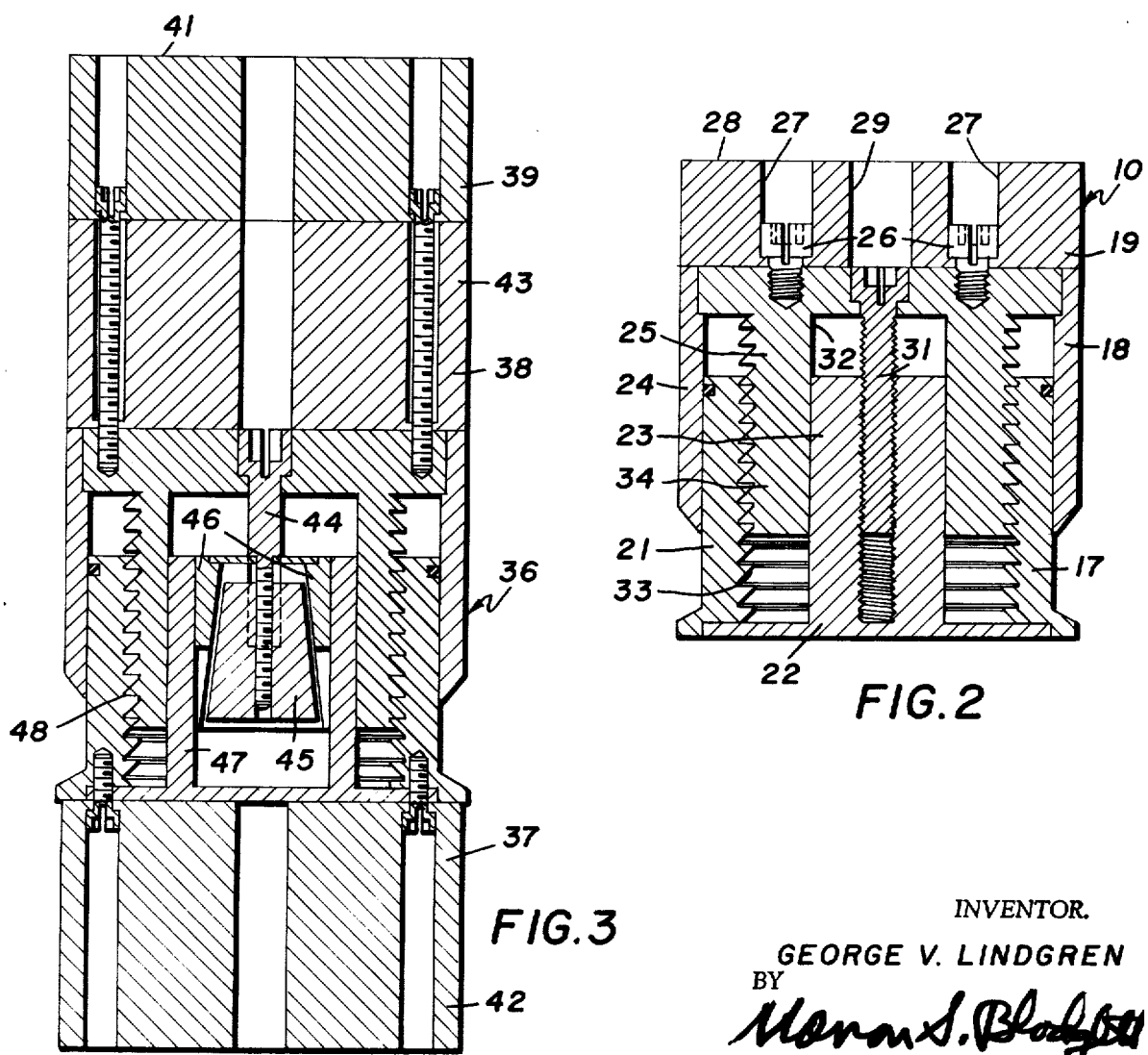
FIG. 2
FIG. 3
INVENTOR.
GEORGE V. LINDGREN
BY
ATTORNEY

MACHINING GAUGE

This is a continuation of application Ser. No. 183,165 filed Sept. 23, 1971, now abandoned.

BACKGROUND OF THE INVENTION

In machining operations and, particularly, in that of grinding, one of the most common operations is the generation of flat horizontal and parallel surfaces. In the case of surface grinding, for instance, a round rotary wheel is used to grind a flat horizontal surface on a workpiece held on a magnetic chucktype work table. With conventional apparatus, it is necessary for the operator to move the wheel downwardly into the workpiece and, while removing a large part of the necessary metal, to miss the level of the desired finished surface of a substantial amount lest too much metal be removed. Then, small amounts of layers of metal are removed successively and the operator measures the level of each surface as it is generated until he arrives at the desired level. This method of slowly approaching the finish surface is very time-consuming and, in terms of labor cost, makes the finished product that much more expensive. It should be understood that the desired level of grinding cannot be determined simply by using the downfeed of the machine, since the amount of deflection in the machine parts depends a great deal on the force being applied to the grinding wheel which, in turn, depends on the amount of material being removed, the rate of feed, and the wheel wear due to the breakdown of the abrasive that constitutes the grinding wheel structure. Attempts to overcome these deficiencies in the past have been unsuccessful in that they have always been very expensive and complicated and readily become inoperative under the unfavorable conditions found in the usual machine shop. These and other difficulties experienced with the prior art devices have been obviated in a novel manner by the present invention.

It is, therefore, and outstanding object of the invention to provide a machining gauge for assistance in the generation of a flat surface at a predetermined distance above the surface of a work table.

Another object of this invention is the provision of a machining gauge which is simple in construction, inexpensive to manufacture, and which is capable of a long life of useful service with a minimum of maintenance.

A further object of the present invention is the provision of a gauge which permits a surface grinding machine to approach a desired finish surface very rapidly and without the necessity of gauging between passes.

It is another object of the instant invention to provide a machine gauge which, while itself being inexpensive, results in a large labor saving.

A still further object of the invention is the provision of a gauge for use with a surface grinding machine having a magnetic work table wherein the gauge may be used in the grinding of inaccessible flat surfaces without interfering with the relative movement between the abrasive wheel and the workpiece.

With these and other objects in view, as will be apparent to those skilled in the art, the invention resides in the combination of parts set forth in the specification and covered by the claims appended hereto.

SUMMARY OF THE INVENTION

In general, the invention consists of a machining gauge having a base adapted to rest on a machine tool table, having an upper member adjustably engaged with the base for adjusting for height, and having a replaceable block mounted on the upper member. The block has a broad, substantially uninterrupted, flat surface to which a marking compound can be applied for engagement by the abrasive wheel of a surface grinder or the like.

More specifically, a locking means is provided between the base and the upper member to prevent relative movement during machining. The base is formed of a material that can be held by a magnetic work table.

BRIEF DESCRIPTION OF THE DRAWINGS

The character of the invention, however, may be best understood by reference to one of its structural forms, as illustrated by the accompanying drawings, in which:

FIG. 1 is a front elevational view of a machining gauge embodying the principles of the present invention, FIG. 2 is a vertical sectional view through the gauge, and FIG. 3 is a vertical sectional view through a modified form of the gauge.

DESCRIPTION OF THE PREFERRED EMBODIMENT

Referring first to FIG. 1, wherein are best shown the general features of the invention, the machining gauge, indicated generally by the reference numeral 10, is shown as resting on a magnetic work table 11 on which is also held a workpiece 12 which has a surface to be finished by use of an abrasive wheel 13. The table 11 is provided with a flat horizontal surface 14 on which the gauge 10 and the workpiece 12 are held by electromagnetic forces. The workpiece 12 has an upper surface 15 which is to be ground by the abrasive wheel 13, while the gauge 10 has a flat upper surface 16 parallel to the table 11 and which has not as yet been reached by the abrasive wheel 13.

FIG. 1 shows the condition of the elements before the surface 15 has been ground to the desired distance above the surface 13 of the table.

Referring now to FIG. 2, it can be seen that the gauge 10 consists generally of a base 17, an upper member 18, and a replaceable wear block 19. The base 17 and the upper member 18 telescope relative to one another and are adjustable for their axial relationship. The base 17 consists of an outer member 21 and an inner member 22 having a vertical single post 23. The inner and outer members are securely locked together to act as one piece. The upper member 18 consists of a tubular outer member 24 and an inner member 25, the inner and outer member being securely locked together to act as one piece. The wear block 19 is securely fastened to the inner member 25 of the upper member 18 by means of bolts 26 resting at the bottom of countersunk bores 27 entering the upper surface 28 of the block 19. These bolts, in addition to Allen wrench sockets, are also provided with a deep screw driver slot to assist in removal if the wear block decreases in size after a period of time and has no support; the bolts can be removed with a screw driver by the operator. The bores are relatively small and serve as insubstantial or small interruptions of the broad, horizontal, upper surface 28 of the block 19. A similar countersunk bore 29 is located centrally of the block 19 and carries at its bottom a bolt 31 which is threadedly engaged with the post 23 extending upwardly from the lower member 17. The inner member 25 is provided with a smooth bore 32 which is slidable over an outer cylindrical surface of the post 23. The inner member 21 of the base 17 is provided with a threaded bore 33 which is threadedly engaged with a downwardly depending boss 34 of the inner member 25 of the upper member 18. The threads on the threaded bore 33 and the complementary threads on the boss 34 are right-hand threads, preferably buttress threads, while those on the bolt 31 and the correspondingly threaded hole in the post 23 are left-handed threads.

The operation of the invention will now be readily understood in view of the above description. The dimension of the surface to be finished on the workpiece 12 is known, for instance, by reading the value from a blueprint. The locking bolt 31 is loosened by using an Allen wrench extending downwardly through the bore 29. The micrometer is used to measure the distance between the surface 28 of the block 19 and the undersurface of the base 17. If this is not the exact value read from the blueprint, then an adjustment is made by rotating the upper member 18 relative to the base 17 making use of the threaded engagement therebetween. As is evident in FIG. 1, the surface of the outer member 24 of the upper member 18 is provided with knurling to assist in this relative rotation. In addition, it can be seen that indicia 35 have been added to the lower edge of the outer member 24 of the upper member 18 to assist in the adjustment of the base and the upper member. The final adjustment, however, should be made by use of a micrometer measuring the distance between the lower surface of the base 17 and the upper surface 28 of the block 19. Then, the upper surface 28 is painted with a marking compound of the well-known type, such as Blue Vitriol, the marking compound drying to give a thin layer with a dark surface. The bolt 31 is now tightened to lock the upper and lower members relative to one another, so that they will not move relative to each other during the machining operation. The gauge is now placed on the machine tool with the undersurface of the base 17 contacting the upper surface of the work table. After the workpiece 12 has also been placed on the table, the table is electrically energized, thus holding the workpiece and the gauge tightly in place. The gauge 10 is placed in such a position relative to the workpiece 12 that the grinding wheel in machinging the upper surface of the workpiece also passes over the upper surface 28 of the gauge. The grinding wheel is advanced downwardly with full power feed in successive or continuous passes to remove material from the workpiece. Eventually, it will pass close to the surface 28 of the gauge and make a slight scratch on the coating on that surface. The operator of the machine knows then that he is very close to obtaining the desired dimension on his finish surface 15. He then disengages the power feed and advances the wheel by hand in short increments until the grinding wheel in passing over the surface 15 and the surface 28 of the gauge exactly cleans off the coated material on the surface. At that time, the surface 15 will be at the desired dimension. As successive operations of a like nature are performed, the operator will probably remove slight amounts of metal from the upper surface 28 of the gauge and the thickness of the block 19 will become smaller and smaller. Eventually, the block upper surface will grind through the heads of the bolts 26 and it will be necessary to replace the block 19. In other words, the block is expendable. The bolts are provided with slots (A) that permit the bolts to be removed by means of a screwdriver and they, as well, become expendable.

FIG. 3 shows a modification of the gauge that is particularly suseful where the height to be measured is quite large; it includes a modified method of locking. The gauge, indicated generally by the reference numeral 36, consists of a base 37 adapted to rest on a machine tool table and an upper member 38 is adjustably engaged with the base for changinig the total length of the base and upper member. A replaceable block 39 is mounted on the upper member and has a broad, substantially uninterrupted, flat surface 41 to which a marking compound can be applied for the setting of a tool. The base 37 is provided with an extension member 42, while the upper member 38 is similarly provided with an extension member 43. A locking bolt 44 is threadedly engageable with a wedge 45 which presses shoes 46 against the walls of a bore 47 formed in the base 37. The screw threads 48 which bring about the adjustable engagement of the base 37 with the upper member 38 are right-hand threads and, in this particular case, the bolt 44 has right-hand threads also, since the actual locking is done with the wedge 45.

It is obvious that minor changes may be made in the form and construction of the invention without departing fom the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. A machinging gauge for setting a grinder comprising:
  a. a base adapted to rest on a machine table, the base being formed of magnetizable material,
  b. an upper member including an inner member adjustably engaged with the base for adjusting the total length of the base and upper member,
  c. a replaceable block mounted on the upper member and having a broad, substantially uninterrupted surface to which a marking compound can be applied for the setting of the grinder,
  d. means for fixing the block to the upper member said means extending upwardly from the member into the block but terminating a substantial distance from the upper surface,
  e. a locking means independent of the adjusting means serving to secure the base and upper member against relative movement, and
  f. a central post extending from the base and slidably engaged with a bore formed in the inner member, the locking means extending from the upper member into the upper end of the post.

2. A machining gauge as recited in claim 1, wherein the adjusting means consisting of inter-engaging threads of one hand and the lockinig means consists of inter-engaging threads of the opposite hand.

3. A machining gauge as recited in claim 1, wherein the adjusting means consisting of inter-engaging threads and the locking means consists of a wedge and shoes.

4. A machining gauge as recited in claim 1, wherein the base is provided with a circular cylindrical surface, wherein the upper member has a depending tubular skirt that slides smoothly over the said cylindrical surface, and wherein the lower edge of the skirt is provided with indicia to permit a rough adjustment of the gauge.

5. A machining gauge as recited in claim 4, wherein a resilient O-ring is interposed between the cylindrical surface of the base and the inner surface of the skirt.

6. A machining gauge as recited in claim 1, wherein an additional wear block is mounted on the bottom of the base to provide for a greater overall height of the gauge and a second means is provided to render the additional block and bottom temporarily inseparable.

* * * * *